United States Patent
Li et al.

(10) Patent No.: US 11,781,923 B1
(45) Date of Patent: Oct. 10, 2023

(54) TEMPERATURE SENSOR BASED ON TWIN HOLE OPTICAL FIBER

(71) Applicant: Xinjiang Technical Institute of Physics and Chemistry, CAS, Urumqi (CN)

(72) Inventors: Linjun Li, Urumqi (CN); Yuqiang Yang, Urumqi (CN); Shilie Pan, Urumqi (CN); Yu Zhou, Urumqi (CN); Xiaoming Duan, Urumqi (CN); Yingjie Shen, Urumqi (CN); Qianqian Hao, Urumqi (CN); Xin He, Urumqi (CN)

(73) Assignee: Xinjiang Technical Institute of Physics and Chemistry, CAS, Urumqi (CN)

( * ) Notice: Subject to any disclaimer, the term of this patent is extended or adjusted under 35 U.S.C. 154(b) by 0 days.

(21) Appl. No.: 18/326,845

(22) Filed: May 31, 2023

(30) Foreign Application Priority Data

Nov. 9, 2022 (CN) .......................... 202211401227.8

(51) Int. Cl.
*G01K 11/3206* (2021.01)

(52) U.S. Cl.
CPC ............................... *G01K 11/3206* (2013.01)

(58) Field of Classification Search
CPC ............... G01K 11/3206; G01K 11/32; G01K 11/3213; G01K 11/322; G01K 11/324
See application file for complete search history.

(56) References Cited

U.S. PATENT DOCUMENTS

2023/0184596 A1*  6/2023  Liu .......................... G01K 5/58
                                                        374/100

* cited by examiner

*Primary Examiner* — John Bedtelyon
(74) *Attorney, Agent, or Firm* — Westbridge IP LLC (57) ABSTRACT

A fiber optic sensing head includes a single-mode optical fiber, a twin hole optical fiber including a cladding region and a core region surrounded by the cladding region, and the core region includes a second core located at an axis center, as well as a first and second round holes symmetrically distributed with respect to the second core; an incoming end of a gradient refractive-index fiber is connected to an outgoing end of the twin hole optical fiber with the incoming end of the gradient index fiber aligned with the outgoing end of the single-mode optical fiber at center. A thermal-sensitive structure is filled in a preset length part of the second round hole extending along an axial direction of the twin hole optical fiber. An incoming end of the twin hole optical fiber is connected to an outgoing end of the gradient index optical fiber with displacement.

9 Claims, 4 Drawing Sheets

TEMPERATURE SENSOR BASED ON TWIN HOLE OPTICAL FIBER

CROSS-REFERENCE TO RELATED APPLICATION

This application claims priority to Chinese Patent Application No. 202211401227.8, filed on Nov. 9, 2022, which is hereby incorporated by reference in its entirety.

TECHNICAL FIELD

The present disclosure relates to the field of fiber optic sensor, in particular to a temperature sensor based on twin hole optical fiber.

BACKGROUND

In industrial production and scientific research, temperature is often an important parameter for characterizing the state of objects and processes. Therefore, accurate measurement and effective control on temperature has become one of the important topics faced by people in scientific research and production practice.

Fiber optic sensors have the advantages of corrosion resistance, immunity to electromagnetic interference, compact structure, good stability, high sensitivity, and the like. Fiber optic sensors have been widely used in various sensing fields, such as energy conservation and environmental protection, industrial and mining enterprises, aerospace, medicine and health, etc. Among various fiber optic sensors, the fiber optic Michelson interferometer has received much attention, especially in the field of fiber optic temperature sensing, due to its unique advantages such as simple fabrication, good stability, compact structure, high sensitivity, and the like. However, the sensitivity of prior fiber optic interferometers still needs to be improved.

SUMMARY

Some embodiments of the present disclosure provide a temperature sensor based on twin hole optical fiber, including: a light source, a fiber optic circulator, a spectrometer, and a fiber optic sensing head; a first port of the fiber optic circulator is optically connected to the light source, a second port of the fiber optic circulator is optically connected to the fiber optic sensing head, and a third port of the fiber optic circulator is optically connected to the spectrometer. The fiber optic sensing head includes:

a single-mode optical fiber, including a first core and a first cladding surrounding the first core;

a twin hole optical fiber, including a second core and a second cladding surrounding the second core, wherein a first round hole and a second round hole extending along the axial direction of the twin hole optical fiber are provided in the second cladding, and are symmetrically distributed on both sides of the second core;

a gradient refractive index optical fiber, an incoming end of the gradient refractive index optical fiber is concentrically connected to an outgoing end of the single-mode optical fiber, and is used to convert an incoming light of the single-mode optical fiber into parallel light, which is incident into the twin hole optical fiber, and to converge the parallel light returned from the twin hole optical fiber into the single-mode optical fiber;

the second round hole is filled with a thermal-sensitive structure in a preset length range extending in an axial direction of the twin hole optical fiber, and the thermal-sensitive structure is located near an outgoing end of the gradient refractive index optical fiber; an incoming end of the twin hole optical fiber is connected to an outgoing end of the gradient refractive index optical fiber with displacement; and incoming ends of the first round hole, the second core, and the second round hole are all within a radial range of the outgoing end of the gradient refractive index optical fiber.

In some embodiments, the displacement between the incoming end of the twin hole optical fiber and the outgoing end of the gradient refractive index optical fiber is 20-40 microns.

In some embodiments, a diameter of the single-mode optical fiber is 125 microns, and a diameter of the first core is 8-10 microns; a diameter of the twin hole optical fiber is 125 microns, and a diameter of the gradient refractive index optical fiber is 125 microns.

In some embodiments, a first Michelson interferometer is formed by a first beam and a third beam, and a second Michelson interferometer is formed by a second beam and a third beam, the first beam is a beam coming into the single-mode optical fiber through the gradient refractive index optical fiber, which is reflected in the first round hole, the second beam is a beam coming into the single-mode optical fiber through the gradient refractive index optical fiber, which is reflected in the second core, the third beam is a beam coming into the single-mode optical fiber through the gradient refractive index optical fiber, which is reflected in the second round hole;

a temperature sensitivity S1 of the first Michelson interferometer and a temperature sensitivity S2 of the second Michelson interferometer have the following relationship therebetween:

$$S_1 = \frac{d\lambda_m}{dT} = \lambda_m \left( \alpha_1 + \frac{\beta_1}{n_1} \right)$$

$$S_2 = \frac{d\lambda_m}{dT} = \lambda_m \left( -\alpha_1 \frac{l_1}{l_2} + \alpha_2 \frac{l_1 + l_2}{l_2} + \frac{\beta_2}{n_2} \right)$$

$\lambda_m$ is the peak wavelength of an incomingh light, $\alpha_1$ and $\beta_1$ are the thermal expansion coefficient and the thermal-optical coefficient of the thermal sensitive structure, respectively, $\alpha_2$ and $\beta_2$ are the thermal expansion coefficient and the thermal-optical coefficient of the second core, respectively, $l_1$ is the length of the thermal sensitive structure, $l_2$ is the length of the second core, $n_1$ and $n_2$ are the refractive index of the thermal structure and the second core, respectively, and T is the ambient temperature.

In some embodiments, the first Michelson interferometer and the second Michelson interferometer constitute a parallel-connection structure, the parallel-connection structure forms an interferogram envelope, and the interferogram envelope has the following relationship:

$$\begin{cases} I_{en}(\lambda) = E \cos\left[ \frac{4\pi(n_1 l_1 - n_2 l_2)}{M\lambda} \right] \\ M = \frac{n_1 l_1}{|n_1 l_1 - n_2 l_2|} \end{cases}$$

$\lambda$ is the wavelength of the incoming light, $I_{en}(\lambda)$ the interferogram envelope, E is the amplitude of the interferogram envelope, and M is the amplification factor of the vernier effect.

In some embodiments, the temperature sensitivity of the fiber optic sensing head has the following relationship:

$$S_{en} = M(S_1 - S_2) = M\lambda_m \left[ \frac{l_1 + l_2}{l_2}(\alpha_1 - \alpha_2) + \frac{\beta_1}{n_1} - \frac{\beta_2}{n_2} \right]$$

$S_{en}$ is the temperature sensitivity, M is the amplification factor of the vernier effect, $S_1$ is the temperature sensitivity of the first Michelson interferometer, and $S_2$ is the temperature sensitivity of the second Michelson interferometer.

In some embodiments, the material of the thermal-sensitive structure is polydimethylsiloxane, and the material of the second core is quartz.

In some embodiments, the optical path length within the thermal-sensitive structure is Δ1, the optical path length in the second core is Δ2, and Δ1 and Δ2 have a relationship therebetween satisfying: 0.45≤Δ1:Δ2≤0.49 or 0.51≤Δ1:Δ2≤0.55.

In some embodiments, a length of the thermal-sensitive structure along the axial direction of the second round hole is half of a length of the second round hole along the axial direction.

With respect to the prior art, the present disclosure has at least the following technical effects:

The temperature sensor based on the twin hole optical fiber provided by the present disclosure generates three beams of reflected light with different optical path lengths by filling the twin hole optical fiber with a certain length of thermal-sensitive material, so as to constitute two Michelson interferometers in parallel-connection structure, and by controlling the length of the thermal-sensitive material, the two Michelson interferometers can produce a vernier effect, so as to improve the sensitivity of the sensor.

BRIEF DESCRIPTION OF THE DRAWINGS

In order to illustrate the technical solutions of the embodiments of the present invention or the prior art more clearly, a brief introduction will be given below to the drawings required in the description of the embodiments or the prior art. Obviously, the drawings in the following description are some embodiments of the present invention, and ordinary skilled persons in the field can obtain other drawings based on these drawings without exercising creative efforts.

DETAILED DESCRIPTION OF THE EMBODIMENTS

In order to clarify the object, the technical solution and advantages clearer, the present disclosure will be further described in detail in conjunction with the accompanying drawings, obviously, the described embodiments are only a portion of the embodiments of the present disclosure, not all embodiments. Based on the embodiments in the present disclosure, all other embodiments obtained by those of ordinary skill in the art without making creative labor, fall within the scope of the protection of the present disclosure.

Terms used in embodiments of the present disclosure are only for the purpose of describing specific embodiments, and are not intended to limit the present disclosure. The singular forms "one", "described" and "the" used in embodiments of the present disclosure and the accompanying claims are also intended to include a majority form, unless the context clearly indicates other meanings, "various" generally includes at least two.

It should be understood that the term "and/or" as used herein is only an association relationship to describe the associated object, indicating that there can be three kinds of relationships, for example, A and/or B, which can mean: A alone, A and B at the same time, and B alone. In addition, the character "/" in this specification generally indicates that the associated object therebefore or thereafter has an "or" relationship therewith.

It should also be noted that the terms "including", "including" or any other variation thereof is intended to cover non-exclusive inclusions so that a good or apparatus including a series of elements includes not only those elements, but also other elements not expressly listed, or elements inherent in such goods or devices. In the absence of further restrictions, the element qualified by the statement "including one" does not exclude the existence of another identical element in the goods or apparatus including said element.

The present disclosure provides a temperature sensor based on twin hole optical fiber, including: a light source, a fiber optic circulator, a spectrometer, and a fiber optic sensing head; a first port of the fiber optic circulator is optically connected to the light source, a second port of the fiber optic circulator is optically connected to the fiber optic sensing head, and a third port of the fiber optic circulator is optically connected to the spectrometer. The fiber optic sensing head includes:

a single-mode optical fiber, including a first core and a first cladding surrounding the first core;

a twin hole optical fiber, including a second core and a second cladding surrounding the second core, wherein a first round hole and a second round hole extending along the axial direction of the twin hole optical fiber are provided in the second cladding, and are symmetrically distributed on both sides of the second core;

a gradient refractive index optical fiber, an incoming end of the gradient refractive index optical fiber is concentrically connected to an outgoing end of the single-mode optical fiber, and is used to convert an incoming light of the single-mode optical fiber into parallel light, which is incident into the twin hole optical fiber, and to converge the parallel light returned from the twin hole optical fiber into the single-mode optical fiber;

the second round hole is filled with a thermal-sensitive structure in a preset length range extending in an axial direction of the twin hole optical fiber, and the thermal-sensitive structure is located near an outgoing end of the gradient refractive index optical fiber; an incoming end of the twin hole optical fiber is connected to an outgoing end of the gradient refractive index optical fiber with displacement; and incoming ends of the first round hole, the second core, and the second round hole are all within a radial range of the outgoing end of the gradient refractive index optical fiber.

The temperature sensor based on the twin hole optical fiber provided by the present disclosure generates three beams of reflected light with different optical path lengths by filling the twin hole optical fiber with a certain length of thermal-sensitive material, so as to constitute two Michelson interferometers in parallel-connection structure, and by controlling the length of the thermal-sensitive material, the two Michelson interferometers can produce a vernier effect, so as to improve the sensitivity of the sensor.

Detailed description would be made below on various embodiments of the present disclosure in connection with the drawings.

Figure 1:
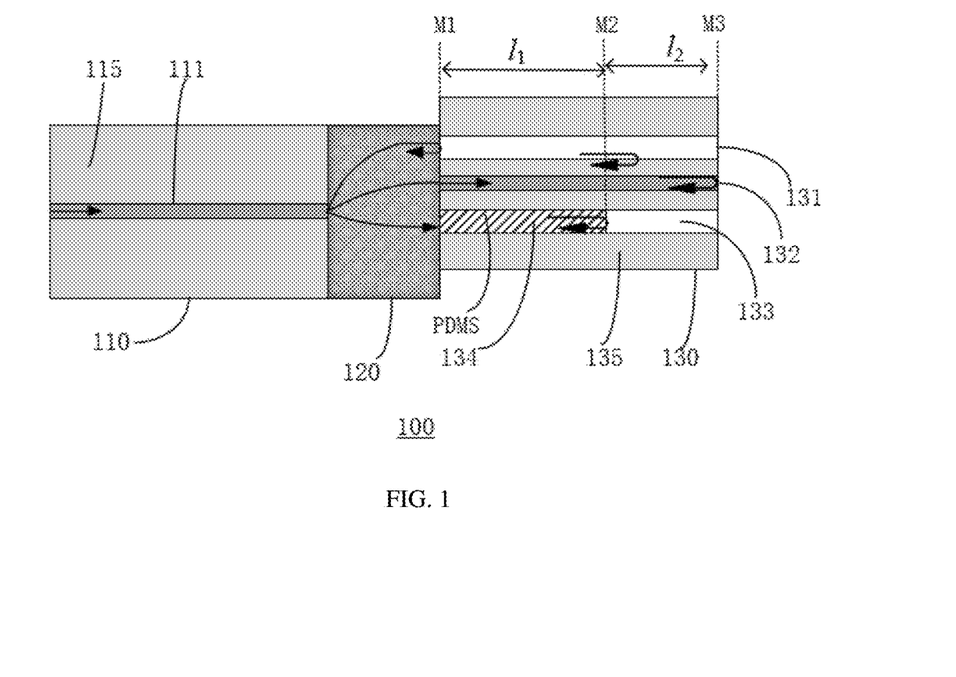
FIG. 1 is a schematic diagram of the structure of the fiber optic sensing head provided by some embodiments of the present disclosure.

With reference to FIG. 1, embodiments of the present disclosure may provide a fiber optic sensing head applicable to fiber optic temperature sensor. The fiber optic sensing head includes: a single-mode optical fiber 110, a gradient refractive index optical fiber 120, and a twin hole optical fiber 130 connected sequentially. An incoming end of the gradient refractive index optical fiber 120 is concentrically connected to an outgoing end of the single-mode optical fiber 110, an outgoing end of the gradient refractive index optical fiber 120 is concentrically connected to an incoming end of the twin hole optical fiber 130, and an outgoing end of the twin hole optical fiber 130 is connected to an incoming end of the gradient refractive index optical fiber 120 with displacement.

In some embodiments of the present disclosure, ends of two optical devices are connected by fusion, i.e., the incoming end of the gradient refractive index optical fiber 120 is concentrically connected to the outgoing end of the single-mode optical fiber 110 by fusion, and the outgoing end of the gradient refractive index optical fiber 120 is connected to the incoming end of the twin hole optical fiber 130 with displacement by fusion. The connection by fusion may reduce the loss of the nodes and improve the reliability of the connection points.

The concentrical connection means that the centers of two optical fibers, such as the axis of symmetry, coincide spatially. The connection with displacement means that the centers of two optical fibers, such as the axis of symmetry, do not coincide spatially. In some embodiments, the outer diameters of the optical fibers to be connected is the same, i.e., the single-mode optical fiber 110, the gradient refractive index optical fiber 120, and the twin hole optical fiber 130 have same outer diameters. Optical fibers with same outer diameters may reduce the difficulty in concentrically connecting optical fiber and simplify the processing process. As an example, the single-mode optical fiber 110, the gradient refractive index optical fiber 120, and the twin hole optical fiber 130 have the same outer diameters, and the outer diameter may be 100 microns~150 microns, such as 125 microns.

The single-mode optical fiber 110 may include a first core 111 and a first cladding 115 surrounding the first core 111. The first core 111 and the first cladding 115 may be made of silica with different refractive indexes. Light may be totally reflected on the interface of the first core 111 and the first cladding 115 and confined in the first core 111 to travel. The first cladding 115 may provide reflection surface and optical isolation for the travel of light and provide a certain mechanical protection. The number of cores in the single-mode optical fiber 110 may be 1, the diameter of the first core 111 is 8 microns~10 microns, and the length of the single-mode optical fiber 110 may be 100 microns~500 microns.

The single-mode optical fiber 110 may include two opposing ends of the incoming end and the outgoing end opposite to the incoming end. The incoming end of the single-mode optical fiber 110 is optically coupled with the fiber optic circulator of the fiber optic temperature sensor, and the outgoing end of the single-mode optical fiber 110 is concentrically connected to the incoming end of the gradient refractive index optical fiber 120.

The gradient refractive index optical fiber 120 is configured to convert the incoming light of the single-mode optical fiber 110 into a parallel light incident to the twin hole optical fiber 130, and converge the directional light returned by the twin hole optical fiber 130 into the single-mode optical fiber 110. The refractive index of the gradient refractive index optical fiber 120 is various throughout the core, so that the light may be converged or dispersed during traveling. The refractive index changing rate and length of the gradient refractive index optical fiber 120 may be selected as needed, i.e., the gradient refractive index optical fiber 120 is required to be configured so that incoming signal from the single-mode optical fiber may just output parallelly through the gradient refractive index optical fiber 120.

The gradient refractive index optical fiber 120 may have two opposite ends of the incoming end and the outgoing end opposite the incoming end. The incoming end of the gradient refractive index optical fiber 120 is concentrically connected to the outgoing end of the single-mode optical fiber 110, and the outgoing end of the gradient refractive index optical fiber 120 is connected to the incoming end of the twin hole optical fiber 130 with displacement.

Figure 2:
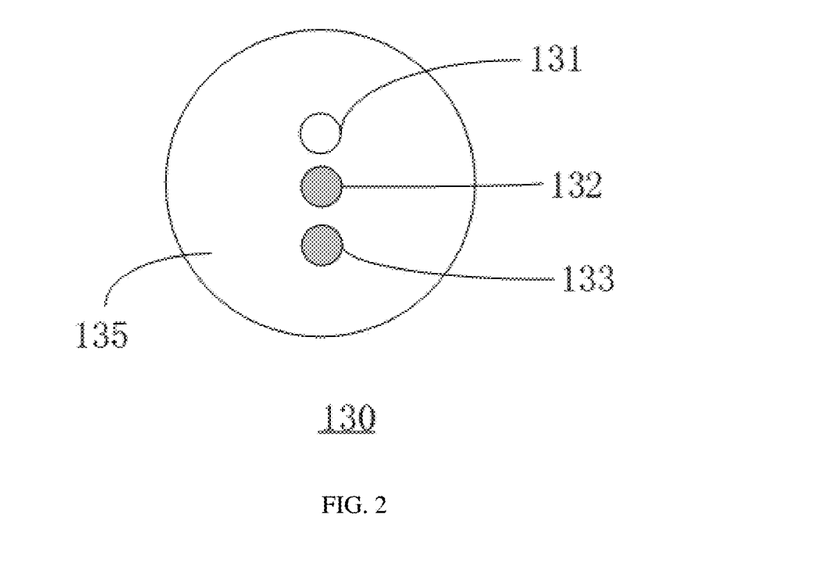
FIG. 2 is a cross-sectional view of a twin hole optical fiber in a fiber optic sensing head provided by some embodiments of the present disclosure.

With reference to FIG. 2, the twin hole optical fiber 130 may include a second core 132 and a second cladding 135 surrounding the second core 132. The second core 132 and the second cladding 135 may be made of silica with different refractive indexes. Light may be totally reflected on the interface of the second core 132 and the second cladding 135 and confined in the second core 132 to travel. The second cladding 135 may provide reflection surface and optical isolation for the travel of light and provide a certain mechanical protection. The twin hole optical fiber 130 may further include a first round hole 131 and a second round hole 133 extending along the axial direction of the twin hole optical fiber in the second cladding, and are symmetrically distributed on both sides of the second core 132. The second core 132 is located on the center of the axis of the twin hole optical fiber 130, the first round hole 131 and the second round hole 133 are symmetrically distributed with respect to the second core 132. As an example, the first round hole 131, the second core 132, and the second round hole 133 may have a diameter of 8-10 microns, the first round hole 131, the second core 132, and the second round hole 133 may have the same diameters. The length of the twin hole optical fiber 130 may be 100 microns to 500 microns. In some embodiments, the first round hole 131 is a hollow round hole, the second core 132 may have a solid structure filled with materials of different refractive indexes. The second round hole 133 may have a structure where thermal-sensitive material is half filled in a hollow round hole.

The twin hole optical fiber 130 may have two opposite ends of the incoming end and the outgoing end opposite the incoming end. The incoming end of the twin hole optical fiber 130 is connected to the outgoing end of the gradient refractive index optical fiber 120 with displacement.

The second round hole 133 may be filled with thermal-sensitive material, which is filled on a side of the round hole near the gradient refractive index optical fiber 120 to form a thermal-sensitive structure 134. In an alternative example, the thermal-sensitive material may be polydimethylsiloxane (PDMS), and polydimethylsiloxane has a strong thermal expansion and contraction effect, which is easy to control the length of the formed thermal-sensitive structure 134, and polydimethylsiloxane is a colorless and transparent solid after solidification, with good light transmission and refractive properties, and polydimethylsiloxane also has good adhesion and chemical inertness, very suitable for combining with optical fibers.

The length of a region filled with thermal-sensitive material in the second round hole 133 may be $l_1$, and the length of a region without thermal-sensitive material filled may be $l_2$. $l_1$ is the length of the thermal-sensitive structure 134. In some embodiments, $l_1 \approx \frac{1}{2}(l_1+l_2)$. The optical path length within the thermal-sensitive structure 134 is $\Delta 1$, the optical path length in the second core 132 is $\Delta 2$, and $\Delta 1$ and $\Delta 2$ have a relationship therebetween satisfying:

0.45≤Δ1:Δ2≤0.49 or 0.51≤Δ1:Δ2≤0.55

The incoming end of the twin hole optical fiber 130 is connected to the outgoing end of the gradient refractive index optical fiber with displacement, and the incoming ends of the first round hole, the second core, and the second round hole are all within a radial range of the outgoing end of the gradient refractive index optical fiber. In some embodiments, the displacement between the incoming end of the twin hole optical fiber and the outgoing end of the gradient refractive index optical fiber is 20-40 microns.

Figure 3:
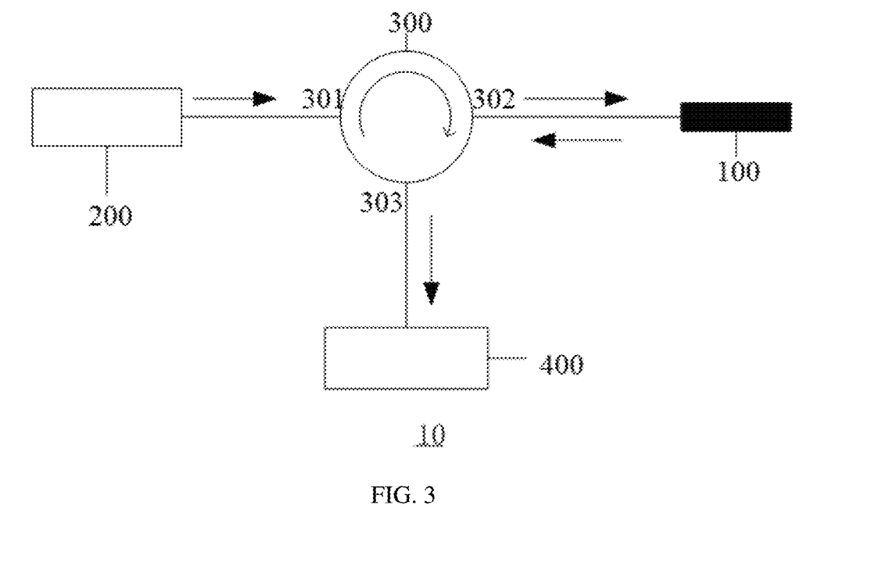
FIG. 3 is a schematic diagram of the structure of a temperature sensor provided by some embodiments of the present disclosure.

With reference to FIG. 3, embodiments of the present disclosure further provide a temperature sensor 10 based on the twin hole optical fiber as mentioned above. The temperature sensor 10 may include a fiber optic sensing head 100, a light source 200, a fiber optic circulator 300, and a spectrometer 400. The light source 200 may be a broad-spectrum light source, and the spectral range is 1400 nm-1600 nm.

The fiber optic circulator 300 may include a first port 301, a second port 302 and a third port 303. The first port 301 is optically connected to the light source 200, the second port 302 of the fiber optic circulator 300 is optically connected to the fiber optic sensing head 100. The incoming light emitted by the light source 200 enters the fiber optic circulator 300 through the first port 301, and enters the fiber optic sensing head 100 through the second port 302 inside the optical fiber circulator 300. The light entering the fiber optic sensing head 100 is reflected by the fiber optic sensing head 100 and returns to the optical fiber circulator 300 through the second port 302, and enters the spectrometer 400 through the third port 303 inside the optical fiber circulator 300.

With reference to FIG. 1, after a light enters the fiber optic sensing head 100 via the single-mode optical fiber 110, the light may form a parallel beam through the gradient refractive index optical fiber 120 and be incident to the twin hole optical fiber 130. The beam in the first round hole 131 is reflected at an interface M1 (the interface between the twin hole optical fiber 130 and the gradient refractive index optical fiber 120), and the reflected signal light enters the single-mode optical fiber 110 after passing through the gradient refractive index optical fiber 120, this signal light is referred as a first beam. The beam in the second core 132 is reflected at an interface M3 (the interface between the outgoing end of the twin hole optical fiber 130 and the air), and the reflected signal light enters the single-mode optical fiber 110 after passing through the second core 132 and the gradient refractive index optical fiber 120, and this signal light is referred as a second beam. The beam in the second round hole 133 is reflected at an interface M2 (the interface between the thermal-sensitive structure 134 and the air), and the reflected signal light enters the single-mode optical fiber 110 after passing through the thermal structure 134 and the gradient refractive index optical fiber 120, this signal light is referred as a third beam.

A first Michelson interferometer may be formed by the first beam and the third beam, and a second Michelson interferometer may be formed by the second beam and the third beam. The first Michelson interferometer and the second Michelson interferometer may be expressed as follows:

$$I_{M1}(\lambda) = I_1 + I_3 - 2\sqrt{I_1 I_3} \cos\left(\frac{4\pi n_1 l_1}{\lambda}\right) \quad (1)$$

$$I_{M2}(\lambda) = I_2 + I_3 - 2\sqrt{I_2 I_3} \cos\left(\frac{4\pi n_2 l_2}{\lambda}\right) \quad (2)$$

Figure 4:
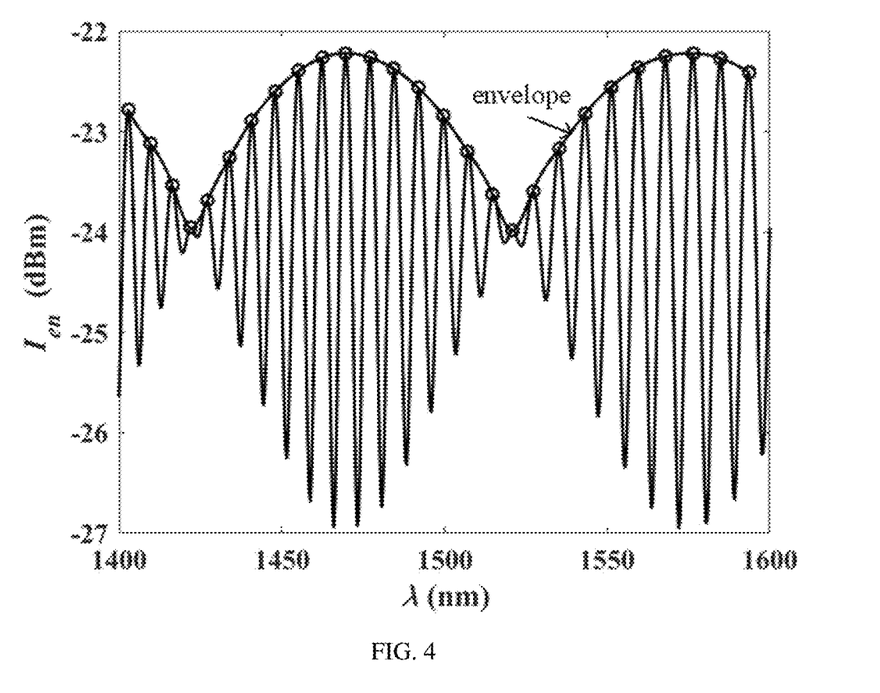
FIG. 4 is an interferogram of two Michelson interferometers in parallel connection involved in some embodiments of the present disclosure.

More particularly, $\lambda$ is the wavelength of incoming light, $I_1$, $I_2$ and $I_3$ are the light intensity of the first beam, the second beam and the third beam, respectively, $l_1$ is a length of the thermal-sensitive structure, $l_2$ is a length of the second round hole without the thermal-sensitive structure, and $n_1$ and $n_2$ are refractive indexes of the thermal-sensitive structure and the second core, respectively. The first Michelson interferometer and the second Michelson interferometer constitute a parallel-connection structure. Since the free spectral range of the two Michelson interferometers is close but not the same, a vernier effect will occur upon the parallel-connection, i.e., there will be an envelope in the interferogram of the parallel-connection structure, and the translation of the envelope with temperature is much greater than that of a single interferometer. The interference spectral envelope may be as shown in FIG. 4 and can be approximately expressed as $$\begin{cases} I_{en}(\lambda) = E \cos\left[\dfrac{4\pi(n_1 l_1 - n_2 l_2)}{M\lambda}\right] \\ M = \dfrac{n_1 l_1}{|n_1 l_1 - n_2 l_2|} \end{cases} \quad (3)$$

$I_{en}(\lambda)$ is the interferogram envelope, E is the amplitude of the interferogram envelope, and M is the amplification factor of the conventional vernier effect.

Considering the temperature sensor 10 provided in the present embodiment, when the temperature changes, it should be noticed that the thermo-optic coefficient and thermal expansion coefficient of air are much smaller than those of quartz, a temperature sensitivity $S_1$ of the first Michelson interferometer and a temperature sensitivity $S_2$ of the second Michelson interferometer may be expressed as $$S_1 = \frac{d\lambda_m}{dT} = \lambda_m\left(\alpha_1 + \frac{\beta_1}{n_1}\right) \quad (4)$$

$$S_2 = \frac{d\lambda_m}{dT} = \lambda_m\left(-\alpha_1\frac{l_1}{l_2} + \alpha_2\frac{l_1+l_2}{l_2} + \frac{\beta_2}{n_2}\right) \quad (5)$$

$\lambda_m$ is the peak wavelength of an incoming light, $\alpha_1$ and $\beta_1$ are the thermal expansion coefficient and the thermal-optical coefficient of the thermal sensitive structure, respectively, $\alpha_2$ and $\beta_2$ are the thermal expansion coefficient and the thermal-optical coefficient of quartz of the second core, respectively. A temperature sensitivity of the first Michelson interferometer and the second Michelson interferometer in parallel-connection, that is, a temperature sensitivity of the interferogram envelope $S_{en}$ is $$S_{en} = M(S_1 - S_2) = M\lambda_m \left[ \frac{l_1 + l_2}{l_2}(\alpha_1 - \alpha_2) + \frac{\beta_1}{n_1} - \frac{\beta_2}{n_2} \right] \quad (6)$$

The present disclosure further performs simulation on property of the temperature sensor 10: the simulation parameters are $\alpha_1 = 9.6 \times 10^{-4}/°$ C., $\beta_1 = -5.0 \times 10^{-4}/°$ C.; $\alpha_2 = 5.5 \times 10^{-7}/°$ C., $\beta_2 = 6.7 \times 10^{-6}/°$ C.; $n_1 = 1.45$, $n_2 = 1.41$, $\lambda_m = 1.550$ um, $I_1 = I_2 = I_3 = 1$, $l_1 = 100$ um, $l_2 = 105$ um.

Figure 5:
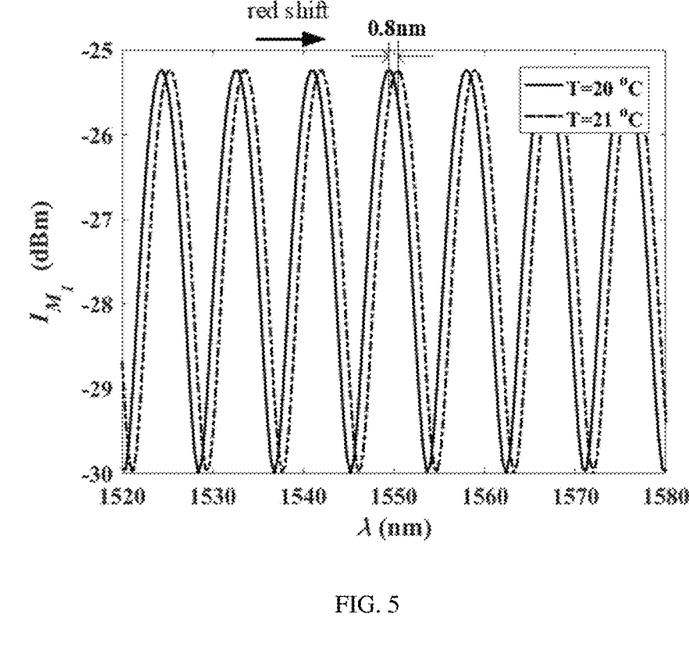
FIG. 5 is an interferogram of the first Michelson interferometer at a specific temperature.

FIG. 5 is an interferogram of the first Michelson interferometer at temperatures of 20° C. and 21° C., respectively, and the results show that when the temperature increases from 20° C. to 21° C., the interferogram of the first Michelson interferometer shifts to a long-wave direction, that is, has a red shift, and the red shift amount is 0.8 nm.

Figure 6:
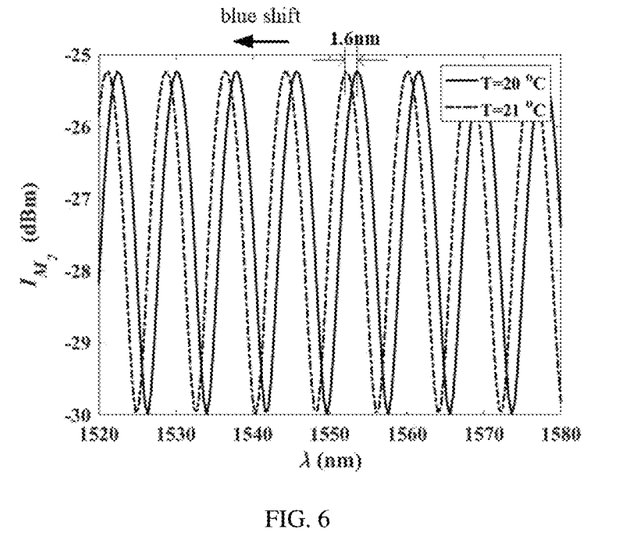
FIG. 6 is an interferogram of the second Michelson interferometer at a specific temperature.

FIG. 6 is an interferogram of the second Michelson interferometer at temperatures of 20° C. and 21° C., respectively, and the results show that when the temperature increases from 20° C. to 21° C., the interferogram of the second Michelson interferometer shifts to the short-wave direction, that is, has a blue shift, and the blue shift amount is 1.6 nm. The second Michelson interferometer has a temperature response opposite to the first Michelson interferometer.

Figure 7:
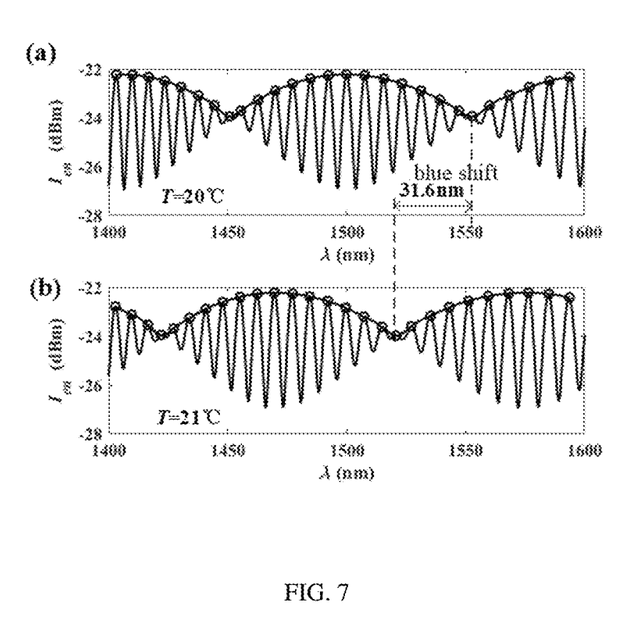
FIG. 7 is an interferogram of a parallel-connection structure consisted of the first Michelson interferometer and the second Michelson interferometer at a specific temperature.

FIG. 7 is an interferogram of the parallel-connection structure consisted of the first Michelson interferometer and the second Michelson interferometer at temperatures of 20° C. and 21° C., respectively, the results show that the interferograms of the parallel-connection structure both have obvious envelope phenomenon at the temperature of 20° C. and 21° C., and when the temperature is increased from 20° C. to 21° C., the interferogram envelope is blue shifted by 31.6 nm, which is 39.5 times that of a single first Michelson interferometer and 17.8 times that of a single second Michelson interferometer.

With respect to the prior art, the temperature sensor and the fiber optic sensing head provided by the present disclosure generate three beams of reflected light with different optical path lengths by filling the twin hole optical fiber with a certain length of thermal-sensitive material, so as to constitute two Michelson interferometers in parallel-connection structure, and by controlling the length of the thermal-sensitive material, the two Michelson interferometers can produce a vernier effect, so as to improve the sensitivity of the sensor.

Finally, it should be noted that each embodiment in the present specification is described in a progressive manner, each embodiment focuses on the difference from other embodiments, and the same or similar parts of each embodiment may refer to each other. Regarding a system or device disclosed by the embodiment, because it corresponds to the method disclosed by the embodiment, the relatively simple description is made, and the relevant description may be referred to the description on the method.

The above embodiments are only used to illustrate the technical solution of the present disclosure without limitation thereon. Although the present disclosure is described in detail with reference to the foregoing embodiments, those of ordinary skill in the art should understand: it may still modify the technical solutions described in the foregoing embodiments, or replace some of the technical features equivalently. And these modifications or replacements do not depart the essence of the corresponding technical solutions from the spirit and scope of the technical solutions of each embodiment of the present disclosure.

What is claimed is:

1. A temperature sensor based on twin hole optical fiber, comprising: a light source, a fiber optic circulator, a spectrometer, and a fiber optic sensing head; a first port of the fiber optic circulator is optically connected to the light source, a second port of the fiber optic circulator is optically connected to the fiber optic sensing head, and a third port of the fiber optic circulator is optically connected to the spectrometer, wherein the fiber optic sensing head comprises:

a single-mode optical fiber, comprising a first core and a first cladding surrounding the first core;

a twin hole optical fiber, comprising a second core and a second cladding surrounding the second core, wherein a first round hole and a second round hole extending along the axial direction of the twin hole optical fiber are provided in the second cladding, and are symmetrically distributed on both sides of the second core;

a gradient refractive index optical fiber, an incoming end of the gradient refractive index optical fiber is concentrically connected to an outgoing end of the single-mode optical fiber, and is used to convert an incoming light of the single-mode optical fiber into parallel light, which is incident into the twin hole optical fiber, and to converge the parallel light returned from the twin hole optical fiber into the single-mode optical fiber;

wherein the second round hole is filled with a thermal-sensitive structure in a preset length range extending in an axial direction of the twin hole optical fiber, and the thermal-sensitive structure is located near an outgoing end of the gradient refractive index optical fiber; an incoming end of the twin hole optical fiber is connected to an outgoing end of the gradient refractive index optical fiber with displacement; and incoming ends of the first round hole, the second core, and the second round hole are all within a radial range of the outgoing end of the gradient refractive index optical fiber.

2. The temperature sensor according to claim 1, wherein the displacement between the incoming end of the twin hole optical fiber and the outgoing end of the gradient refractive index optical fiber is 20-40 microns.

3. The temperature sensor according to claim 1, wherein a diameter of the single-mode optical fiber is 125 microns, and a diameter of the first core is 8-10 microns; a diameter of the twin hole optical fiber is 125 microns, and a diameter of the gradient refractive index optical fiber is 125 microns.

4. The temperature sensor according to claim 1, wherein a first Michelson interferometer is formed by a first beam and a third beam, and a second Michelson interferometer is formed by a second beam and a third beam, the first beam is a beam coming into the single-mode optical fiber through the gradient refractive index optical fiber, which is reflected in the first round hole, the second beam is a beam coming into the single-mode optical fiber through the gradient refractive index optical fiber, which is reflected in the second core, the third beam is a beam coming into the single-mode optical fiber through the gradient refractive index optical fiber, which is reflected in the second round hole;

a temperature sensitivity $S_1$ of the first Michelson interferometer and a temperature sensitivity $S_2$ of the second Michelson interferometer have the following relationship therebetween:

$$S_1 = \frac{d\lambda_m}{dT} = \lambda_m\left(\alpha_1 + \frac{\beta_1}{n_1}\right)$$

$$S_2 = \frac{d\lambda_m}{dT} = \lambda_m\left(-\alpha_1\frac{l_1}{l_2} + \alpha_2\frac{l_1+l_2}{l_2} + \frac{\beta_2}{n_2}\right)$$

wherein $\lambda_m$ is the peak wavelength of an incoming light, $\alpha_1$ and $\beta_1$ are the thermal expansion coefficient and the thermal-optical coefficient of the thermal sensitive structure, respectively, $\alpha_2$ and $\beta_2$ are the thermal expansion coefficient and the thermal-optical coefficient of the second core, respectively, $l_1$ is the length of the thermal sensitive structure, $l_2$ is the length of the second core, $n_1$ and $n_2$ are the refractive index of the thermal structure and the second core, respectively, and T is the ambient temperature.

5. The temperature sensor according to claim 4, wherein the first Michelson interferometer and the second Michelson interferometer constitute a parallel-connection structure, the parallel-connection structure forms an interferogram envelope, and the interferogram envelope has the following relationship:

$$\begin{cases} I_{en}(\lambda) = E\,\cos\left[\dfrac{4\pi(n_1 l_1 - n_2 l_2)}{M\lambda}\right] \\ M = \dfrac{n_1 l_1}{|n_1 l_1 - n_2 l_2|} \end{cases}$$

where $\lambda$ is the wavelength of the incoming light, $I_{en}(\lambda)$ the interferogram envelope, E is the amplitude of the interferogram envelope, and M is the amplification factor of the vernier effect.

6. The temperature sensor according to claim 4, wherein the temperature sensitivity of the fiber optic sensing head has the following relationship:

$$S_{en} = M(S_1 - S_2) = M\lambda_m\left[\frac{l_1+l_2}{l_2}(\alpha_1 - \alpha_2) + \frac{\beta_1}{n_1} - \frac{\beta_2}{n_2}\right]$$

wherein $S_{en}$ is the temperature sensitivity, M is the amplification factor of the vernier effect, $S_1$ is the temperature sensitivity of the first Michelson interferometer, and $S_2$ is the temperature sensitivity of the second Michelson interferometer.

7. The temperature sensor according to claim 1, wherein the material of the thermal-sensitive structure is polydimethylsiloxane, and the material of the second core is quartz.

8. The temperature sensor according to claim 1, wherein the optical path length within the thermal-sensitive structure is $\Delta 1$, the optical path length in the second core is $\Delta 2$, and $\Delta 1$ and $\Delta 2$ have a relationship therebetween satisfying: $0.45 \leq \Delta 1:\Delta 2 \leq 0.49$ or $0.51 \leq \Delta 1:\Delta 2 \leq 0.55$.

9. The temperature sensor according to claim 1, wherein a length of the thermal-sensitive structure along the axial direction of the second round hole is half of a length of the second round hole along the axial direction.

\* \* \* \* \*